United States Patent [19]
Hettinga

[11] Patent Number: 5,945,053
[45] Date of Patent: Aug. 31, 1999

[54] EXTRUDED-IN FABRIC HINGE AND METHOD OF MAKING SAME

[76] Inventor: Siebolt Hettinga, 2123 NW. 111th St., Des Moines, Iowa 50325-3788

[21] Appl. No.: 09/042,164

[22] Filed: Mar. 13, 1998

[51] Int. Cl.⁶ .......................... B29C 47/02; B32B 31/30
[52] U.S. Cl. .................. 264/171.13; 16/225; 264/313; 264/316; 425/114
[58] Field of Search ................. 16/225; 264/171.13, 264/171.1, 171.21, 171.14, 242, 251, 252, 250, 257, 275, 316, 313; 425/113, 114

[56] References Cited

U.S. PATENT DOCUMENTS

| | | |
|---|---|---|
| 2,687,157 | 8/1954 | Cowan . |
| 3,755,031 | 8/1973 | Hoffman et al. ........................ 156/79 |
| 4,060,947 | 12/1977 | Naka ...................................... 52/179 |
| 4,065,539 | 12/1977 | Nadel ..................................... 264/251 |
| 4,189,877 | 2/1980 | Jentoft et al. ............................ 52/58 |
| 4,327,474 | 5/1982 | Holden et al. ......................... 29/149.5 |
| 4,391,303 | 7/1983 | Holgersson ............................ 136/166 |
| 5,336,460 | 8/1994 | Hettinga ................................. 264/251 |
| 5,463,794 | 11/1995 | Erland ..................................... 16/225 |
| 5,762,852 | 6/1998 | Hettinga ................................. 264/251 |
| 5,851,467 | 12/1998 | Murasaki ................................. 264/167 |

Primary Examiner—Jan H. Silbaugh
Assistant Examiner—Mark Eashoo
Attorney, Agent, or Firm—Brian J. Laurenzo; Michael C. Gilchrist

[57] ABSTRACT

An extruded-in fabric hinge comprised of a fabric hinge member extruded-in with a first member and a second member such that at least some of the fibers of the fabric hinge member are embedded within the first and second members. An extruder apparatus with an extrusion cavity comprised of a first surface with a first adjustable mandrel, a second surface, a third surface, and a fourth surface integrated to form the extrusion cavity is used to make the extruded-in fabric hinge. A fabric hinge member is captured between the first adjustable mandrel and the second surface, and an extrusion material is extruded through an extrusion inlet of the extruder apparatus and into the extrusion cavity. The extrusion material integrates with the fabric hinge member such that at least some of the fibers of the fabric hinge member are embedded into the first and second members of the extruded-in fabric hinge.

12 Claims, 5 Drawing Sheets

5,945,053

EXTRUDED-IN FABRIC HINGE AND METHOD OF MAKING SAME

BACKGROUND OF THE INVENTION

The invention relates to an extruded-in fabric hinge and a method of making the extruded-in fabric hinge, and more particularly, to the extruded-in fabric hinge comprising a fabric hinge member extruded-in with a first member and a second member such that at least some of the fibers of the fabric hinge member are embedded into the first and the second members.

Traditionally, hinges have been constructed of metal. Metal hinges, however, suffer from a number of drawbacks. Metal hinges do not function well when repeatedly exposed to harsh or corrosive chemicals. For example, hinges used for automotive applications often undergo exposure to grime and dirt, chemicals applied to road surfaces, and chemicals used in association with the internal operation of the automobile. Over time, interaction between the hinge members and the surrounding environment severely deteriorate the hinge. Therefore, metal hinges require periodic cleaning or even replacement.

Even under ideal conditions metal hinges experience significant wear. The various members of the hinge wear against each other causing damage to the metal surfaces. Often over time the hinges cease to operate silently, and begin to squeak or creak when in operation. This effect is exacerbated when the hinge undergoes load stress. The stress tends to warp and bend the hinge, which in turn increases the wear and tear on the hinge. As a results, metal hinges requires periodic lubrication and/or realignment. Furthermore, the shear bulk and size of some hinges can create an impediment to the flexibility of the hinge. In some cases, the range of motion of the hinge members is restricted by the hinge itself.

In response to these and other problems alternatives to the traditional metal hinge have been developed. In some cases, hinges can be constructed of non-metal materials and secured through the use of adhesives and solvents. However, adhesives and solvents also are susceptible to the corrosive effects of chemicals. Additionally, the adhesives and solvents narrow the range of acceptable materials. Many materials, including thermoplastic materials, resist bonding with solvents and adhesives and/or are damaged by adhesives and solvents.

U.S. Pat. No. 5,336,460 discloses a method of making an injection molded hinge that utilizes a deformable lamina comprised of woven or non-woven textile, vinyl, or film. The process involves the manipulation of a large injection molding apparatus with a large fixed mold unit. Thus, changes to the configuration of the hinge require retooling the mold apparatus with a new mold unit. This method of production requires producing the articles in a specific location, under specific predetermined conditions, for later distribution to the site of actual use. Additionally, each hinge produced by an injection molding apparatus requires a separate processing cycle. It would be desirable to reduce the time required to produce each hinged article.

SUMMARY OF THE INVENTION

An object of the present invention comprises providing an extruded-in fabric hinge with superior corrosion resistant properties.

Another object of the present invention comprises providing an extruded-in fabric hinge capable of long lasting silent, low maintenance operation.

An additional object of the present invention comprises providing an extruded-in fabric hinge capable of long lasting operation without excessive wear of the hinge components.

Another object of the present invention comprises providing an extruded-in fabric hinge secured with a long lasting durable bond without the use of adhesives or solvents.

Yet another object of the present invention comprises providing an extruded-in fabric hinge that can be constructed from a wide variety and type of materials.

A further object of the present invention comprising providing a method to make an extruded-in hinge that can flexibly produce hinges with a wide variety of configurations.

These and other objects of the present invention will become apparent to those skilled in the art upon reference to the following specification, drawings, and claims.

The present invention intends to overcome the difficulties encountered heretofore. To that end, the present invention comprises an extruded-in fabric hinge comprised of a fabric hinge member extruded-in with a first member and a second member. An extruder apparatus with an extrusion cavity comprised of a first surface with a first adjustable mandrel, a second surface, a third surface, and a fourth surface integrated to form the extrusion cavity is used to make the extruded-in fabric hinge. A fabric hinge member is captured between the first adjustable mandrel and the second surface, and an extrusion material is extruded through an extrusion inlet of the extruder apparatus and into the extrusion cavity. The extrusion material integrates with the fabric hinge member such that at least some of the fibers of the fabric hinge member are embedded into the first and second members of the extruded-in fabric hinge.

BRIEF DESCRIPTION OF THE DRAWINGS

FIG. 7b is a side elevation view of the non-woven fabric hinge member of the extruded-in fabric hinge of FIG. 7a.

DETAILED DESCRIPTION OF THE INVENTION

Figure 1:
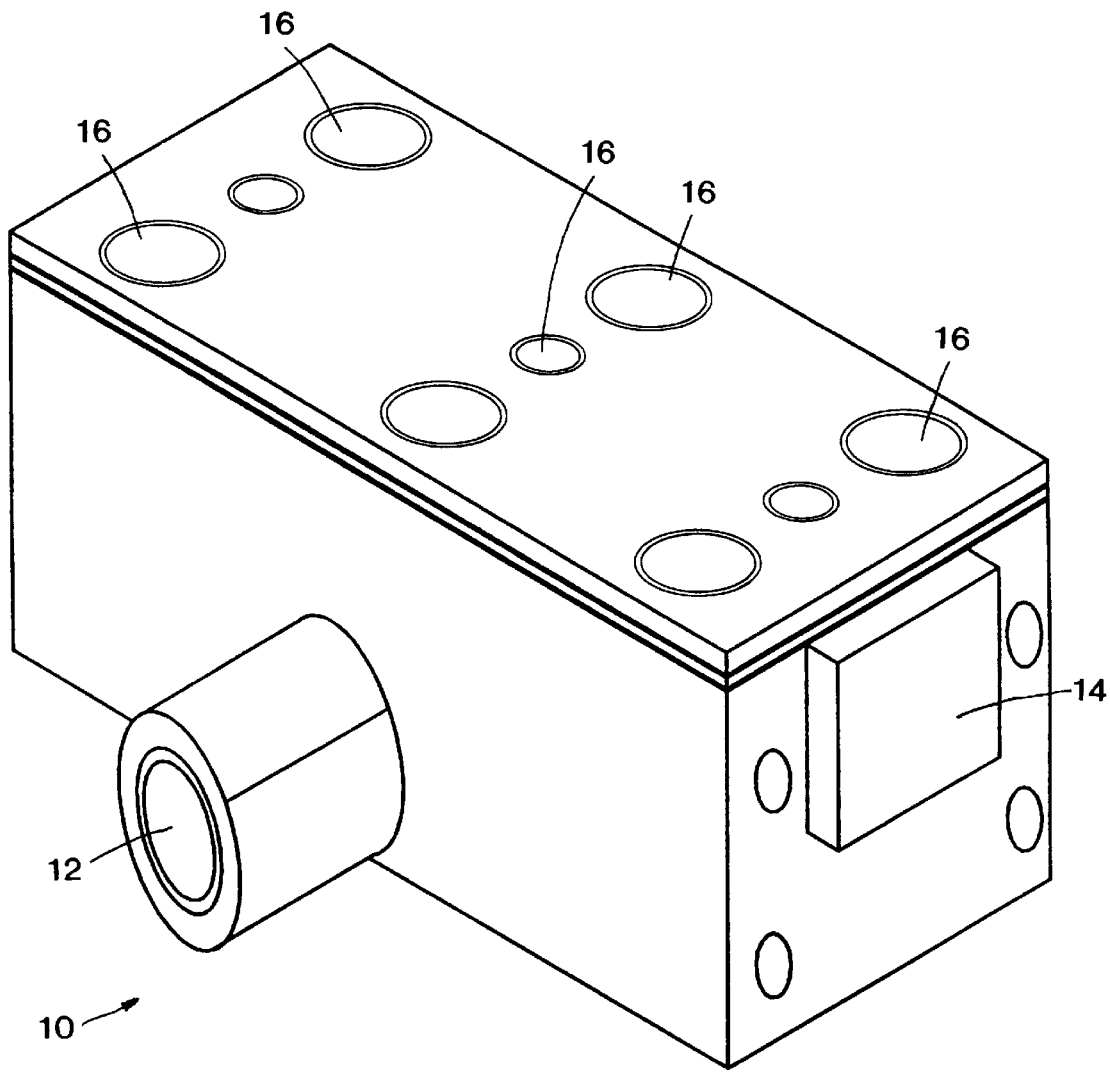
FIG. 1 is a perspective view of an extruder apparatus.
Figure 2:
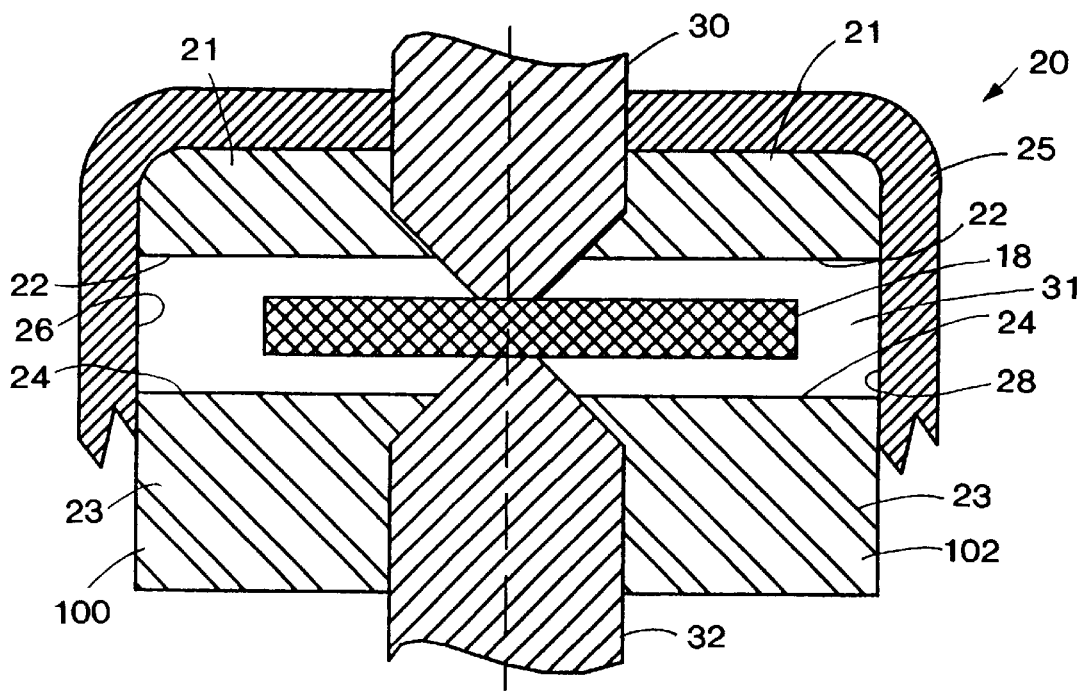
FIG. 2 is a cross section view of an extrusion chamber of the extruder apparatus of FIG. 1.
Figure 3:
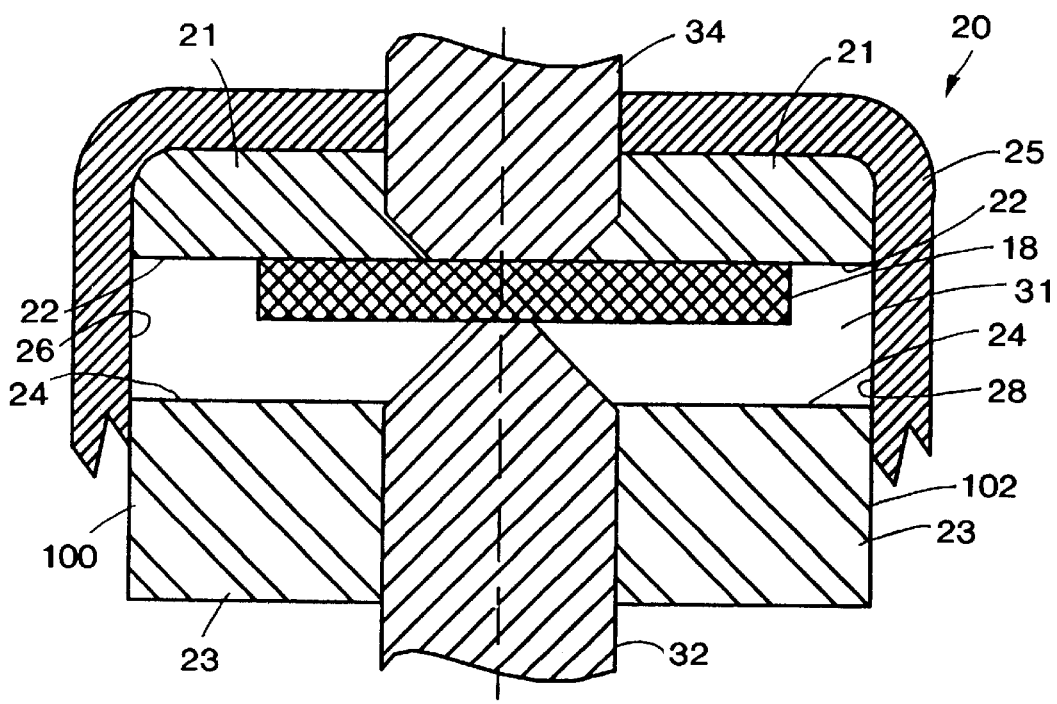
FIG. 3 is a cross section view of the extrusion chamber of the extruder apparatus of FIG. 1.

In the figures, FIG. 1 shows an extruder 10 with an extruder inlet 12 and a fabric hinge member inlet 14. The extruder inlet 12 of the extruder 10 allows an extrusion material to enter the extruder 10 and enter an extrusion chamber 20, which lies at the interior of the extruder 10 (FIGS. 2–3). In the preferred embodiment, the extrusion material is comprised of a thermoplastic material. However, those skilled in the art will recognize the extrusion material can comprise any other suitable or equivalent material The extruder 10 also includes a fabric hinge member inlet 14 for the introduction of a fabric hinge member 18 into the extruder cavity 20 of the extruder 10. The fabric hinge member 18 can be provided from a spool (not shown) to provide a continuous feed into the extruder chamber 20 of the extruder 10. The extruder 10 also includes adjustments ports 16 through which adjustment bars (not shown) can be inserted to adjust the various adjustable members of the extruder cavity 20 of the extruder 10. Additionally, an extrusion table (not shown) can be added to receive the ejected fabric hinge members 36, 52, 68 from the extruder 10. The extrusion table can be equipped to pull the extrusion material from the extruder. Thus, the combined force of the extrusion material entering the extruder inlet 12 and the pulling force of the extrusion table ensures the continuous flow of extrusion material into the extruder 10 and the continuous flow of the extruded-in fabric hinges 36, 52, 68 from the extrusion chamber 20.

FIG. 2 shows the extrusion chamber 20 formed by a cavity body 25, an upper cavity block 21, and a lower cavity block 23. The upper cavity block 21 forms a first surface 22, and the lower cavity block 23 forms a second surface 24. Additionally, the lower cavity block 23 is divided into a first adjustable portion 100 and a second adjustable portion 102. The cavity body 25 wraps around the upper cavity block 21 and the lower cavity block 23 thereby forming a third surface 26 and a fourth surface 28. The first surface 22, second surface 24, third surface 26, and the forth surface 28 form an extrusion cavity 31. It is within the extrusion cavity 31 of the extruder chamber 20 that the extruded-in fabric hinges 36, 52, 68 are produced. The extrusion chamber 20 also contains a first adjustable mandrel 30 which is located in the center of the upper cavity block 21, and a second adjustable mandrel 32 which separates the lower cavity block 23 into the first adjustable portion 100 and the second adjustable portion 102. FIG. 3 shows the extrusion chamber 20 modified to receive a replaceable mandrel 34 in place of the first adjustable mandrel 30. The extrusion chamber 20 of the extruder 10 configured according to FIGS. 2–3 is capable of producing extruded-in fabric hinges according to the following method.

The first adjustable mandrel 30 and the second adjustable mandrel 32 of the extrusion chamber 20 (FIG. 2), or in the alternative the replaceable mandrel 34 and the second adjustable mandrel 32 of the extrusion chamber 20 (FIG. 3), are adjusted to a desired position within the extrusion chamber 20. The exact adjustment position of the mandrels 30, 32, 34 will determine the position of the fabric hinge member 18 within the extrusion cavity 31. Thus, in FIG. 2 the first adjustable mandrel 30 and the second adjustable mandrel 32 are adjusted such that the fabric hinge member 18 will lie approximately in the center of the extrusion cavity 31. FIG. 3 shows an alternative adjustment position of the replaceable mandrel 34 and the second adjustable mandrel 32, whereby the fabric hinge member 18 will be positioned adjacent to the first surface 22 of the upper cavity block 21 of the extrusion chamber 20. Of course, it is possible to configure the extrusion chamber 20 such that the mandrels 30, 32, 34 are fixed rather than adjustable, thereby permanently determining the position of the fabric hinge member 18 within the extrusion cavity 31. The adjustment of the mandrels 30, 32, 34 within the extrusion chamber 20 allows the mandrels 30, 32, 34 to capture the fabric hinge member 18 therebetween. FIG. 2 shows that the fabric hinge member 18 is captured between the first mandrel 30 and the second mandrel 32 such that the fabric hinge member 18 lies in the center of the extrusion cavity 31, while FIG. 3 shows that the fabric hinge member 18 is captured between the removable mandrel 34 and the second adjustable mandrel 32 such that the fabric hinge member is in contact with the first surface 22 of the upper cavity block 21 of the extrusion chamber 20.

Additionally, the first adjustable portion 100 and the second adjustable portion 102 of the second surface 24 of the lower cavity block 23 of the extrusion chamber 20 are adjusted to control the distance between the second surface 24 of the lower cavity block 23 and the first surface 22 of the upper cavity block 21. Adjusting the position of the first adjustable portion 100 and the second adjustable portion 102 of the lower cavity block 23 determines the thickness of the extruded-in fabric hinge. Moving the first and second adjustable portions 100, 102 of the lower cavity block 23 away from the first surface 22 of the upper cavity block 21 increases the thickness of the extruded-in fabric hinges 36, 52, 68. Alternatively, moving the first and second adjustable portions 100, 102 of the lower cavity block 23 toward the first surface 22 of the upper cavity block 21 decreases the thickness of the extruded-in fabric hinges 36, 52, 68. With the fabric hinge member 18 captured between the first adjustable mandrel and the second adjustable mandrel 32 (FIG. 2), or the replaceable mandrel 34 and the second adjustable mandrel 32 (FIG. 3), the extrusion material will surround the fabric hinge member thereby filling the extrusion cavity 31 and allowing the fibers of the fabric hinge member 18 to embed into the extrusion material. The extrusion material, however, does not embed within that portion of the fabric hinge member 18 that lies between the mandrels 30, 32, 34, thereby allowing the fabric hinge members 36, 52, 68 to bend about that portion of the fabric hinge member 18 that lies between the mandrels 30, 32, 34. The fabric hinge member 18 will continue to move between the mandrels 30, 32, 34 during the extrusion process. Thus, the mandrels 30, 32, 34 capture the fabric hinge member 18 with enough force to prevent the extrusion material from embedding into that portion of the fabric hinge member 18 that lies between mandrels 30, 32, 34, but not with so much force that the fabric hinge member 18 cannot move between the mandrels 30, 32, 34 during the extrusion process.

The width and shape of the mandrels 30, 32, 34 combined with the thickness of the fabric hinge member 18 will determine the bending radius of the extruded-in fabric hinge 36, 52, 68. The wider the mandrels 30, 32, 34 and the narrower the fabric hinge member 18 the greater the bending radius of the extruded-in fabric hinges 36, 52, 68. By contrast, reducing the width of the mandrels 30, 32, 34 and increasing the thickness of the fabric hinge member 18 will reduce the bending radius of the extruded-in fabric hinges 36, 52, 68. Additionally, mandrels 30, 32 have tapered ends which will increase the bending radius of the extruded-in fabric hinge 36, 52, 68. The tapered mandrels 30, 32 better allow the extruded-in fabric hinges 36, 52, 68 to bend in both directions as well as bending further in either direction.

Figure 4A:
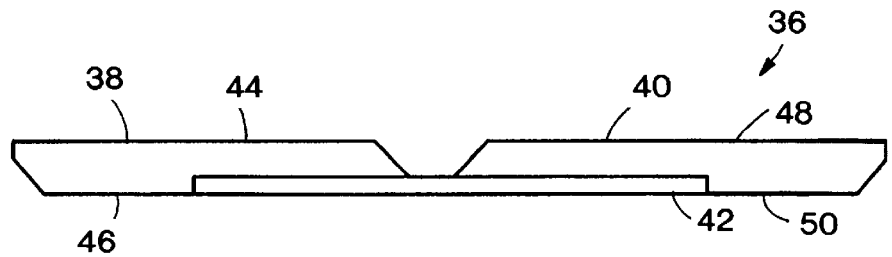
FIG. 4a is a side elevation view of an extruded-in fabric hinge.
Figure 4B:
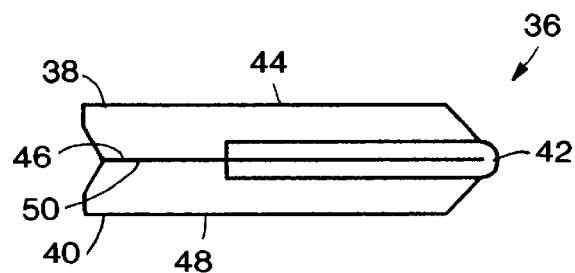
FIG. 4b is a side elevation view of the extruded-in fabric hinge of FIG. 4a in a bent position.
Figure 6A:
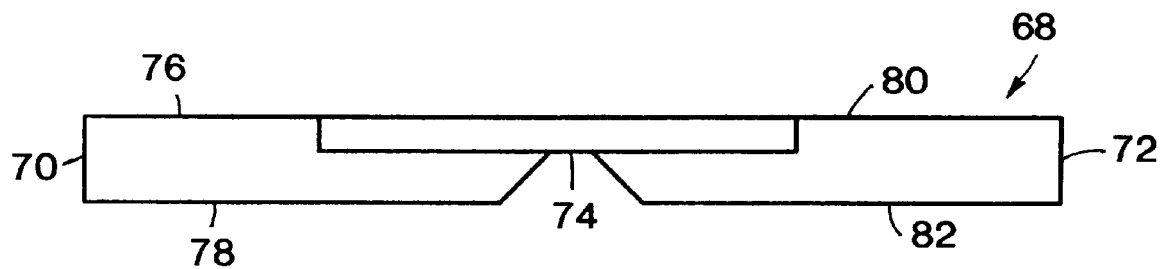
FIG. 6a is a side elevation view of an extruded-in fabric hinge.
Figure 6B:
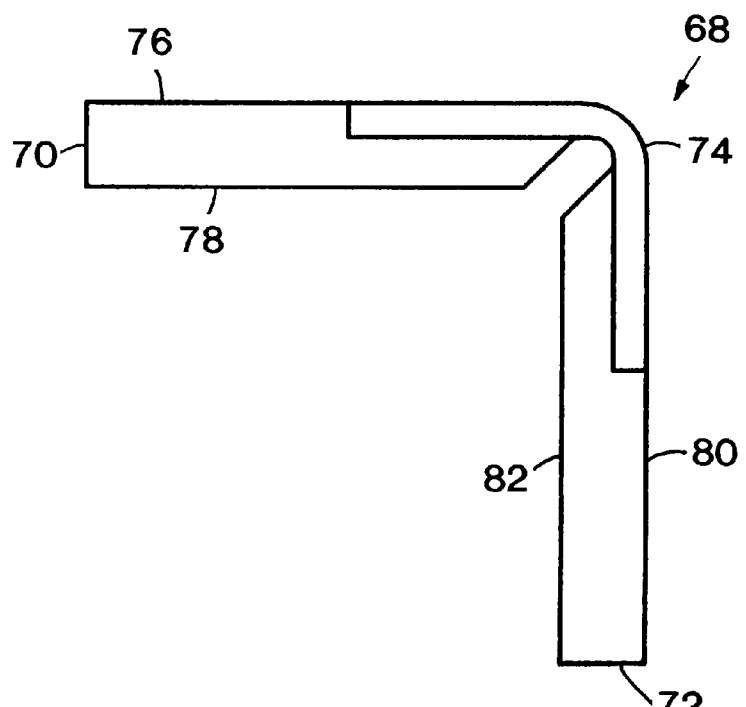
FIG. 6b is a side elevation view of the extruded-in fabric hinge of FIG. 6a in a bent position.

FIGS. 4a–b show an extruded-in fabric hinge 36. The extruded-in fabric hinge 36 is comprised of a first member 38, a second member 40, and a fabric hinge member 42. The first member 38 of the extruded-in fabric hinge 36 contains a first surface 44 and a second surface 46. In a similar manner, the second member 40 of the extruded-in fabric hinge 36 contains a first surface 48 and a second surface 50. The extruded-in fabric hinge 36 is configured such that the fabric hinge member 42 is extruded-in with the second surface 46 of the first member 38 and with the second surface 50 of the second member 40. FIG. 4b shows the extruded-in fabric hinge 36 at one extreme of motion. In this position the second surface 50 of the second member 40 and the second surface 46 of the first member 38 of the extruded-in fabric hinge 36 contact each other. The extruded-in fabric hinge 36 with the fabric hinge member 42 extruded-in with the second surfaces 50, 46 of the first member 38 and the second member 40 is produced by a method whereby the replaceable mandrel 34 and the second adjustable mandrel 32 are configured in the manner shown in FIG. 3. Of course, the extrusion chamber 20 can be configured such that the replaceable mandrel 34 occupies the position of the second adjustable mandrel 32, and the second adjustable mandrel 32 occupies the position of the replaceable mandrel 34. Configured in this manner the extrusion chamber 20 can produce the extruded-in fabric hinge 68 shown in FIGS. 6a–b. FIG. 6a shows that the extruded-in fabric hinge 68 is comprised of a first member 70, a second member 72, and a fabric hinge member 74. The first member 70 of the extruded-in fabric hinge 68 contains a first surface 76 and a second surface 78. In a similar manner, the second member 72 of the extruded-in fabric hinge 68 contains a first surface 80 and a second surface 82. The fabric hinge member 74 is extruded-in with the first surface 76 of the first member 70 and with the first surface 80 of the second member 72. FIG. 6b shows the extruded-in fabric hinge 68 in a bent position. The extruded-in fabric hinge 36 and the extruded-in fabric hinge 68 represent identical articles except for the positioning of the fabric hinge members 42, 74. It is understood that both extruded-in fabric hinge 36 and extruded-in fabric hinge 68 can be produced in the extrusion chamber 20 shown in FIG. 3, however, the extrusion chamber 20 can be configured through the aforementioned manipulation of the replaceable mandrel 34 and the second adjustable mandrel 32 to separately produce the extruded-in fabric hinges 36, 68.

Figure 5A:
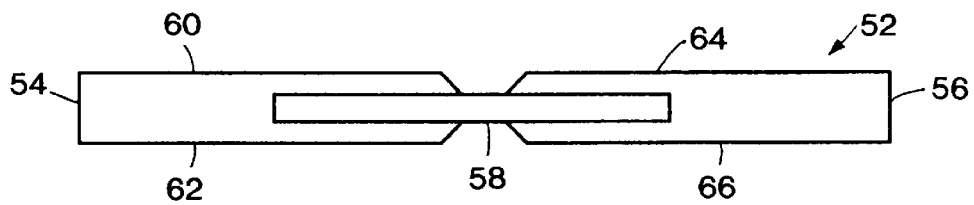
FIG. 5a is a side elevation view of an extruded-in fabric hinge.
Figure 5B:
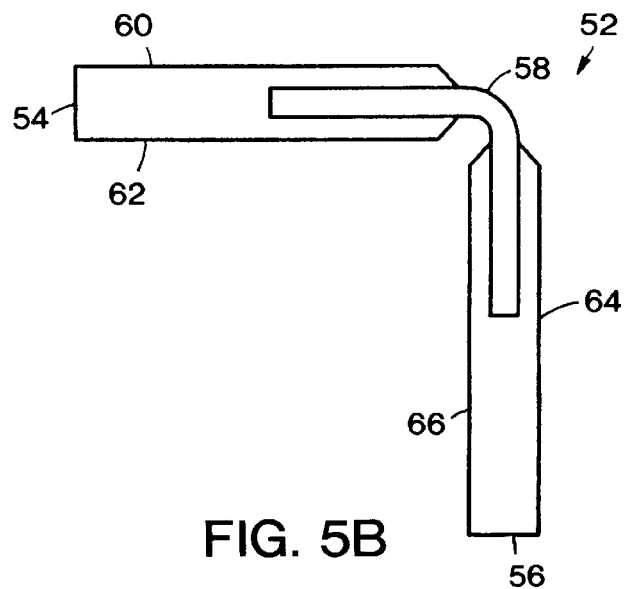
FIG. 5b is a side elevation view of the extruded-in fabric hinge of FIG. 5a in a bent position.

FIG. 5a shows an extruded-in fabric hinge 52 comprised of a first member 54, a second member 56 and a fabric hinge member 58. The first member 54 of the extruded-in fabric hinge 52 includes a first surface 60 and a second surface 62. Similarly, the second member 56 of the extruded-in fabric hinge 52 also includes a first surface 64 and a second surface 66. The fabric hinge member 58 is extruded-in with the first member 54 and the second member 56 of the extruded-in fabric hinge 52 such that the fabric hinge member 58 is generally enclosed within the first member 54 and the second member 56 of the extruded-in fabric hinge 52. FIG. 5b shows the extruded-in fabric hinge 52 in a bent position. The extruded-in fabric hinge 52 is produced in the extrusion chamber 20 depicted in FIG. 2. FIG. 2 shows that the first adjustable mandrel 30 and the second adjustable mandrel 32 adjust to a position where the fabric hinge member 18 is captured between the mandrels 30, 32 in a manner that suspends the fabric hinge member 18 within the extrusion cavity 31.

Figure 7A:
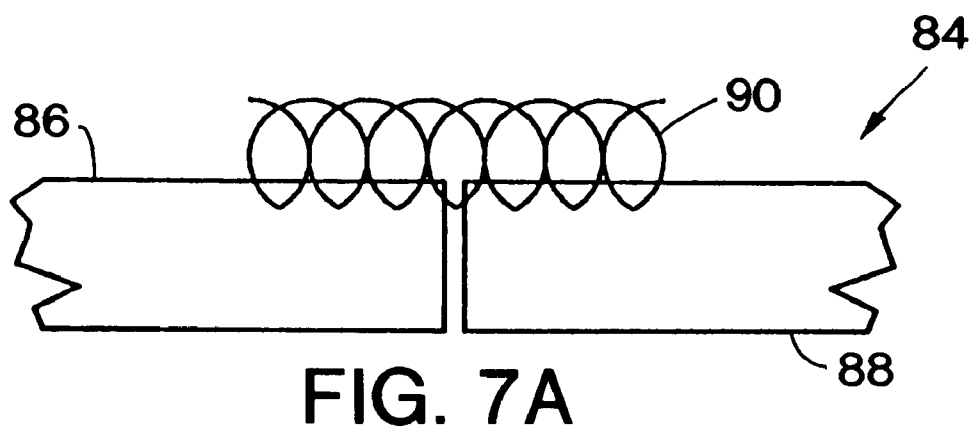
FIG. 7a is a side elevation view of an extruded-in fabric hinge with a non-woven fabric hinge member.
Figure 7B:
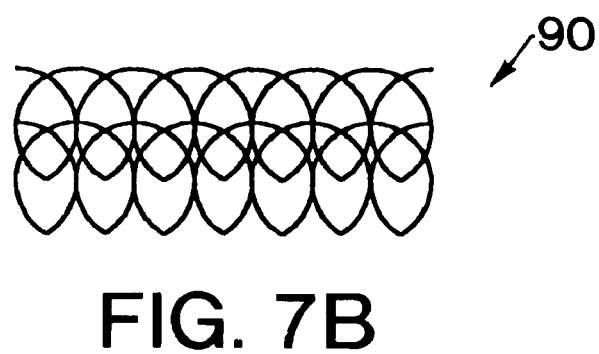
Figure 8:
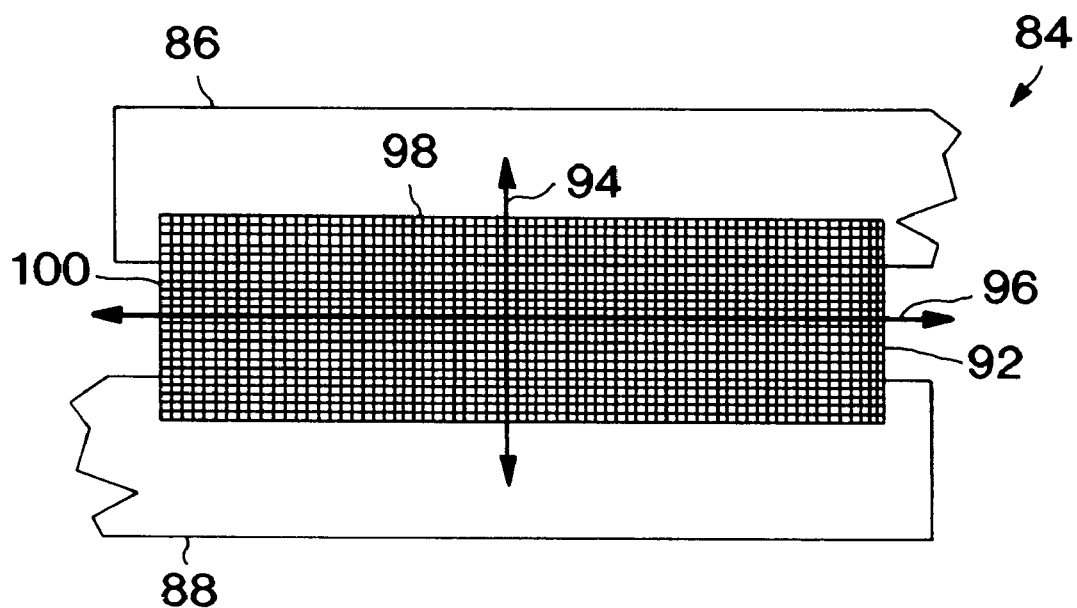
FIG. 8 is a side elevation view of an extruded-in fabric hinge with a woven fabric hinge member.

FIG. 7a shows an extruded-in fabric hinge 84 comprised of a first member 86, a second member 88, and a non-woven fabric hinge member 90. The non-woven fabric hinge member 90 is comprised of either a number of randomly positioned fibers, or a few long randomly looping fibers (FIG. 7b). The advantage of the non-woven fabric hinge member comprises that the extruded-in fabric hinge 84 can bear load in any direction due to the random orientation of the fibers within the non-woven fabric hinge member 90. FIG. 8 shows an extruded-in fabric hinge 84 comprised of the first member 86, a second member 88, and a woven fabric hinge member 92. The woven fabric hinge member 92 contains a first set of fibers 98 oriented along a first axis 94 and a second set of fibers 100 oriented along a second axis 96, such that the first axis 94 and the second axis 96 are transversely oriented to each other (FIG. 8). Manipulation of the orientation of the woven fabric hinge member 92 as well as the warp, woof, and denier of the woven fabric hinge member 92 will affect the load bearing characteristics of the extruded-in fabric hinge 84. For example, using the strong lengthwise fibers oriented along one of the axes 94, 96 of the woven fabric hinge member 92 can enhance the load bearing characteristics along that axis. Of course, the woven fabric hinge member 92 can be oriented such that the second axis 96 orients transversely to the first and second members 86, 88. This configuration can strengthen the extruded-in fabric hinge 84 to prevent the first and second members 86, 88 from moving relative to each other in a direction transverse to the direction of pivoting. It is contemplated that the non-woven fabric hinge member 84 and the woven fabric hinge member 92 can be constructed from a wide range of fabrics, including fabrics that contain carbon fibers, ceramic fibers, natural fibers, plastic fibers, or even Teflon coated fibers for a non-stick effect.

The extruded-in fabric hinge of the present invention contain numerous advantages over prior art hinges. The extruded-in fabric hinge of the present invention can function in a wide variety, and range, of operating conditions including freezing conditions, extreme heat, exposure to dirt and grime, and exposure to corrosive chemicals. The extruded-in fabric hinge of the present invention has the advantage of resisting the deleterious effects of operating in the aforementioned environments. Additionally, the extruded fabric hinge of the present invention requires essentially no maintenance and operate silently. Further, by extruding-in the fabric hinge member the components of the extruded-in hinge of the present invention will not separate or delaminate like hinges constructed with glue or other adhesive materials. Eliminating the need to use solvents or adhesive materials greatly increases the range of acceptable materials available to construct the extruded-in fabric hinge of the present invention. Many materials resist adhesion with adhesives or solvents and/or are damaged by adhesives or solvents. Another advantage of the extruded-in fabric hinge of the present invention comprises the wide range of configurations possible using the aforementioned method. Additionally, the extruded-in fabric hinge of the present invention can be constructed with nearly unlimited bending radius, can bend in either direction, and allows for an aesthetically pleasing appearance through the selection of the fabric for the fabric hinge member. Furthermore, the extruded-in fabric hinge of the present invention can be extruded in unlimited lengths and later cut into the appropriate size and shape for use in a wide variety of applications.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing form the scope of the invention. For example, the extrusion cavity could be configured such that the fabric hinge member can be captured within the extrusion cavity such that the fabric hinge member is in contact with both the first and second surfaces of the extrusion cavity.

I claim:

1. A method for producing an extruded-in fabric hinge where a fabric hinge member is extruded-in with an extrusion material such that at least some of the fibers of the fabric hinge member are embedded into the extrusion material thereby forming a silent operating and corrosion-resistant hinge with a long lasting durable bond between the extrusion material and the fabric hinge member, said method comprising the steps of:
    a) providing a fabric hinge member;
    b) providing an extrusion cavity with a first surface with a first mandrel, a second surface, a third surface, and a fourth surface whereby said surfaces integrate to form said extrusion cavity;
    c) providing an extrusion inlet for receiving said extrusion material and for supplying said extrusion material to said extrusion cavity;
    d) providing a fabric hinge member inlet for receiving said fabric hinge member and for supplying said fabric hinge member to said extrusion cavity;
    e) capturing said fabric hinge member between said first mandrel of said first surface and said second surface with enough force to prevent the extrusion material from embedding into that portion of the fabric hinge that lies between said first mandrel and said second surface; and
    f) extruding said extrusion material through said extrusion inlet and into said extrusion cavity with said fabric hinge member captured between said first mandrel and said second surface whereby said fabric hinge member is extruded-in with said extrusion material such that at least some of the fibers of said fabric hinge member are embedded into said extrusion material.

2. The invention in accordance with claim 1 wherein said second surface of said extrusion cavity further comprises a second mandrel positioned opposite to said first mandrel of said first surface of said extrusion cavity.

3. The invention in accordance with claim 2 wherein said fabric hinge member is captured between said first mandrel of said first surface of said extrusion cavity and said second mandrel of said second surface of said extrusion cavity.

4. The invention in accordance with claim 3 wherein each of said first mandrel of said first surface of said extrusion cavity and said second mandrel of said second surface of said extrusion cavity is adjustable to a desired position within said extrusion cavity.

5. The invention in accordance with claim 4 further comprising the step of adjusting said first mandrel of said first surface of said extrusion cavity and said second mandrel of said second surface of said extrusion cavity to a desired position within the extrusion cavity thereby defining the position of the fabric hinge member within the extruded-in fabric hinge.

6. The invention in accordance with claim 5 wherein said first mandrel of said first surface of said extrusion cavity and said second mandrel of said second surface of said extrusion cavity are adjusted such that said fabric hinge member is in contact with and positioned adjacent to said first surface of said extrusion cavity.

7. The invention in accordance with claim 5 wherein said first mandrel of said first surface of said extrusion cavity and said second mandrel of said second surface of said extrusion cavity are adjusted such that said fabric hinge member is suspended between said first surface of said extrusion cavity and said second surface of said extrusion cavity.

8. The invention in accordance with claim 1 wherein said second surface further comprises a first adjustable portion and a second adjustable portion with said second mandrel positioned therebetween.

9. The invention in accordance with claim 8 further comprising the step of adjusting said first and said second adjustable portions of said second surface of said extrusion cavity to control the distance between said first and said second adjustable portions of said second surface of said extrusion cavity and said first surface of said extrusion cavity thereby defining a thickness of said extruded-in fabric hinge.

10. The invention in accordance with claim 1 wherein said fabric hinge member is a non-woven fabric.

11. The invention in accordance with claim 1 wherein said fabric hinge member is a woven fabric.

12. A method for producing an extruded-in fabric hinge where a fabric hinge member is extruded-in with an extrusion material such that at least some of the fibers of the fabric hinge member are embedded into the extrusion material thereby forming a silent operating and corrosion-resistant hinge with a long lasting durable bond between the extrusion material and the fabric hinge member, said method comprising the steps of:
    a) providing a woven fabric hinge member;
    b) providing an extrusion chamber comprising:
        i) a first surface with a first adjustable mandrel;
        ii) a second surface with a first adjustable portion, a second adjustable portion, and a second adjustable mandrel positioned opposite to said first adjustable mandrel;
        iii) a third surface; and
        iv) a fourth surface whereby said surfaces integrate to form said extrusion cavity;
    c) providing an extrusion inlet for receiving said extrusion material and for supplying said extrusion material to said extrusion cavity;
    d) providing a fabric hinge member inlet for receiving said fabric hinge member and for supplying said fabric hinge member to said extrusion cavity;
    e) capturing said fabric hinge member between said first adjustable mandrel of said first surface and said second adjustable mandrel of said second surface with enough force to prevent the extrusion material from embedding into that portion of the fabric hinge that lies between said first mandrel and said second surface;
    f) adjusting said first adjustable mandrel of said first surface of said extrusion cavity and said second adjustable mandrel of said second surface of said extrusion cavity to a desired position within the extrusion cavity thereby defining the position of the fabric hinge member within said extruded-in fabric hinge;
    g) adjusting said first and said second adjustable portions of said second surface of said extrusion cavity to control the distance between said first and said second adjustable portions of said second surface of said extrusion cavity and said first surface of said extrusion cavity thereby defining a thickness of said extruded-in fabric hinge; and
    h) extruding said extrusion material through said extrusion inlet and into said extrusion cavity whereby said captured fabric hinge member is extruded-in with said extrusion material such that at least some of the fibers of said fabric hinge member are embedded into said extrusion material.

* * * * *